United States Patent
Baentsch et al.

(10) Patent No.: US 9,824,220 B2
(45) Date of Patent: Nov. 21, 2017

(54) SECURE EXECUTION OF SOFTWARE MODULES ON A COMPUTER

(71) Applicant: International Business Machines Corporation, Armonk, NY (US)

(72) Inventors: Michael Baentsch, Rueschlikon (CH); Peter Buhler, Rueschlikon (CH); Luis Garces-Erice, Rueschlikon (CH); Thomas Gschwind, Rueschlikon (CH); Frank Hoering, Rueschlikon (CH); Michael Kuyper, Rueschlikon (CH); Sean Rooney, Rueschlikon (CH); Paolo Scotton, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/780,920

(22) PCT Filed: Mar. 14, 2014

(86) PCT No.: PCT/IB2014/059804
§ 371 (c)(1),
(2) Date: Sep. 28, 2015

(87) PCT Pub. No.: WO2014/155229
PCT Pub. Date: Oct. 2, 2014

(65) Prior Publication Data
US 2016/0070914 A1    Mar. 10, 2016

(30) Foreign Application Priority Data

Mar. 28, 2013  (GB) .................................. 1305727.8

(51) Int. Cl.
*G06F 21/57*    (2013.01)
*G06F 9/44*     (2006.01)
*H04L 29/06*    (2006.01)

(52) U.S. Cl.
CPC .......... *G06F 21/575* (2013.01); *G06F 9/4406* (2013.01); *H04L 63/145* (2013.01); *G06F 2221/033* (2013.01); *G06F 2221/2141* (2013.01)

(58) Field of Classification Search
CPC ..... G06F 21/575; G06F 9/4406; H04L 63/145
See application file for complete search history.

(56) References Cited

U.S. PATENT DOCUMENTS 6,546,332 B2   4/2003  Matsuo
6,907,522 B2   6/2005  Morias et al.
(Continued)

FOREIGN PATENT DOCUMENTS

CN    1469238 A      1/2004
CN    101067842 A    11/2007
(Continued)

OTHER PUBLICATIONS

Search Report PCT/IB2014/059804.
(Continued)

*Primary Examiner* — Stefan Stoynov
(74) *Attorney, Agent, or Firm* — Mark G. Edwards

(57) ABSTRACT

A system and method for executing software modules on a computer, the method comprising: executing (S4) a bootloader (15, 16), at least partly (16) in the computer (101); and upon execution of the bootloader: accessing (S5) requirements as to an initial set (IS) of software modules (SMn); and hardware specifications of the computer; determining (S6) within said initial set, one or more candidate sets (CS1, CS2) of software modules that are compatible (S6a) with said hardware specifications and can (S6b) be stored as a RAM disk; and storing (S9) the software modules of a final set (FS) on a RAM disk (121), the final set (FS) being one of the one or more candidate sets, and instructing (Continued)

to execute the software modules stored on the RAM disk, wherein each of the initial set and the final set of software modules comprises application components and operating system image components, and preferably further comprises hardware component drivers.

14 Claims, 5 Drawing Sheets

(56) References Cited

U.S. PATENT DOCUMENTS

| | | | |
|---|---|---|---|
| 7,447,890 B2 | 11/2008 | Lee et al. | |
| 7,676,840 B2 | 3/2010 | Morais et al. | |
| 7,788,477 B1* | 8/2010 | Huang | G06F 9/4416 713/1 |
| 8,468,334 B1* | 6/2013 | Jonna | G06F 9/4403 713/1 |
| 8,499,142 B1* | 7/2013 | Ramamurthy | G06F 9/4406 713/1 |
| 8,695,102 B2 | 4/2014 | Bade et al. | |
| 2002/0193939 A1 | 12/2002 | Matsuo | |
| 2003/0229777 A1 | 12/2003 | Morais et al. | |
| 2006/0026612 A1 | 2/2006 | Lee et al. | |
| 2006/0277546 A1 | 12/2006 | Rothman et al. | |
| 2007/0261123 A1 | 11/2007 | Bade et al. | |
| 2010/0077196 A1* | 3/2010 | Wang | G06F 3/0607 713/2 |

FOREIGN PATENT DOCUMENTS

| | | |
|---|---|---|
| CN | 101460924 A | 6/2009 |
| DE | 10204095 A1 | 1/2003 |
| DE | 30330627 D1 | 2/2010 |
| EP | 1369764 A2 | 10/2003 |
| JP | 2003-004455 A | 1/2003 |
| JP | 2004-013905 A | 1/2004 |
| JP | 2006-031663 A | 2/2006 |
| JP | 2007-299400 A | 11/2007 |
| JP | 2008-542928 A | 11/2008 |
| JP | 2009-301504 A | 12/2009 |
| JP | 2010-257302 A | 11/2010 |
| KR | 1020080010464 A | 1/2008 |
| TW | 292556 B | 1/2008 |
| TW | 314289 B | 9/2009 |
| WO | 2006130876 A2 | 12/2006 |

OTHER PUBLICATIONS

Unknown, "IBM Zone Trusted Information Channel (ZTIC)," IBM Research, Zurich, Printed Jun. 8, 2017, 2 pages http://www.zurichibm.com/ztic/.

Weigold, et al., "Secure Confirmation of Sensitive Transaction Data in Modern Internet Banking Services," Draft paper submitted to WorldCIS 2011 Conference, Printed Jun. 8, 2017, 8 pages http://www.zurich.ibm.com/pdf/csc/WorldCIS-draft.pdf.

Baentsch, et al., "A Banking Server's Display on your Key Chain," ERCIM News 73, online edition, Apr. 2008, 3 pages, https://ercim-news.ercim.eu/en73/rd/a-banking-servers-display-on-your-key-chain.

Weigold, et al., "The Zurich Trusted Information Channel—An Efficient Defence Against Man-in-the-Middle and Malicious Software Attacks," Springer, 2008, 3 pages, DOI: 10.1007/978-3-540-68979-9_6 https://rd.springer.com/chapter/10.1007/978-3-540-68979-9_6.

* cited by examiner

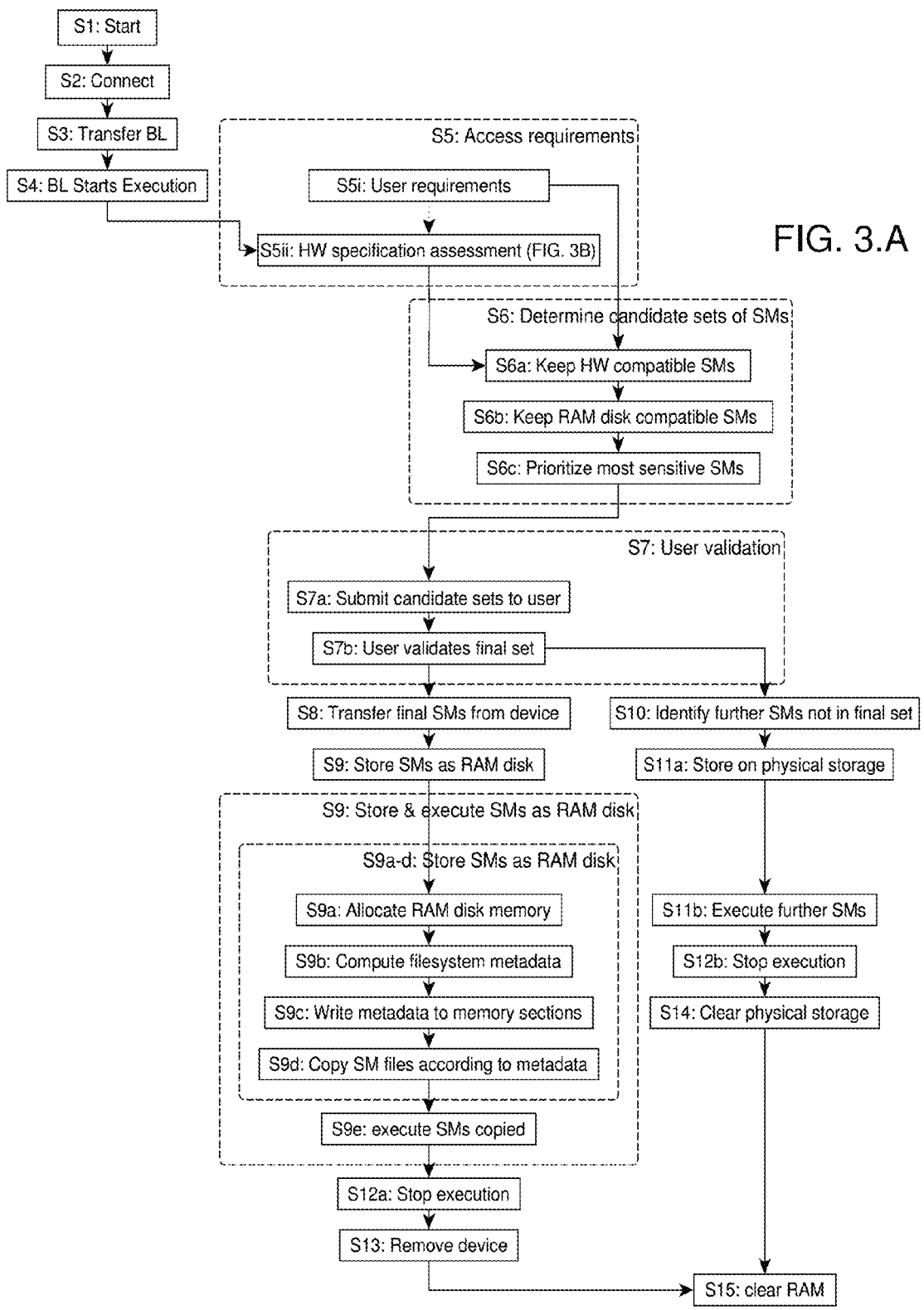
FIG. 3.A

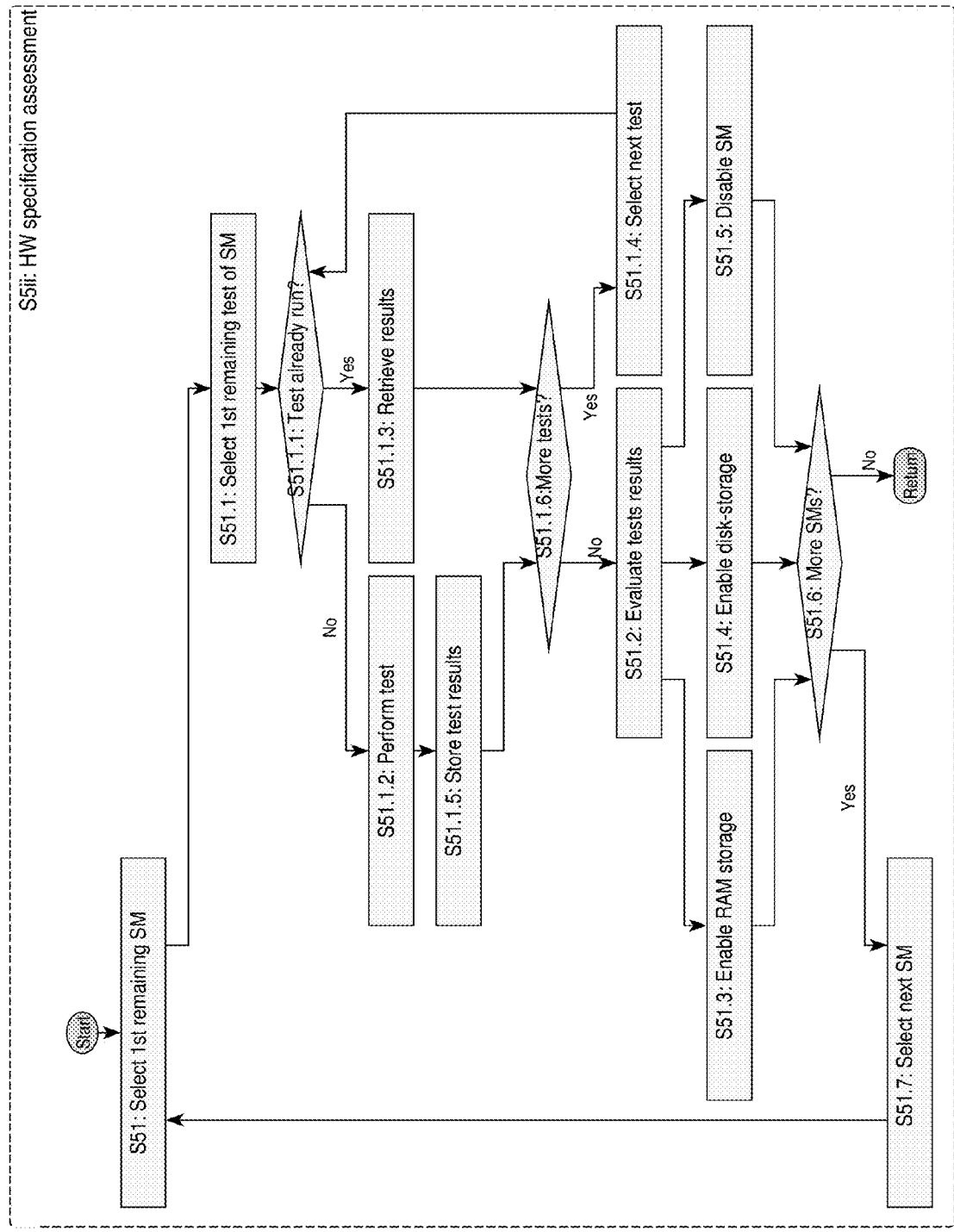
FIG. 3.B

SECURE EXECUTION OF SOFTWARE MODULES ON A COMPUTER

FIELD OF THE INVENTION

The invention relates in general to the field of methods for securely booting computers, for secure execution of software modules thereon, which software modules comprise application components and operating system image components.

BACKGROUND OF THE INVENTION

From a security perspective, running a general-purpose operating system (or GPOS) on a computer, e.g., a personal computer (PC) can be considered a risk, as flaws in this GPOS (or in applications running on top of the GPOS) can cause malicious software exploiting the flaws to perform unwanted operations, like stealing passwords (keylogging) or other information like corporate information (screen scraping), etc.

The standard methods used to deal with this challenge include: the so-called "security software"; server-side virtualization solutions; client-side virtualization solutions; and software-trust chains or securely loaded (booted) operating system kernels. These methods have various drawbacks, mostly arising from possible flaws in the GPOS.

Another way to deal with the above challenge relies on the concept of certified and fault-free GPOS. However, no reliable implementation of such a system with all functionality required by the market for GPOSs exists, to the knowledge of the present inventors. Certain components in operating systems can be certified (to conform to certain security properties), yielding the concept of special-purpose, secure operating systems (or SPOS), e.g., for smart cards. The most significant drawback for this approach (beyond the impracticality of certifying hundreds of millions of lines of GPOS code) is that the basic concept of a GPOS (namely that it is general-purpose and can be easily extended) somehow contradicts the goal of proving and sealing functional properties of a secure OS.

In this context, present inventors have designed a secure solution to ascertain the integrity of the application software running on an operating system, including the assets that this software manages (e.g., secret corporate data).

Such a solution should notably benefit a "bring your own" (BYO) computing work environment. BYO generally relates to "Bring your own device" (BYOD), "bring your own technology" (BYOT), or closely related, "bring your own behavior" (BYOB). BYOD or BYOT concerns corporate/business policy of how employees can bring and use personal mobile devices at work and access employers' email, databases and files, while otherwise using such devices at home, whereby personal applications/data are accessed though the same devices. Beyond hardware, BYOB extends this to software used on the device.

Besides, as any software executed on a computer may be under attack by a number of viruses and malicious softwares (or malware) present on the PC's operating system, a known solution is to restart a PC from an external boot media, e.g., stored on a user-trusted device, typically a secure device, and start a new and—from a security perspective—clean operating system (OS) from the external media. However, this approach raises additional issues, which embodiments of the present invention aims at resolving too.

Finally, external boot media are often provided on trusted devices (including secure, tamper proof devices), which type of devices is generally known. For example, for online transactions, a solution which has been developed is the so-called Zone Trusted Information Channel (or ZTIC for short), see e.g., "The Zurich Trusted Information Channel—An Efficient Defence against Man-in-the-Middle and Malicious Software Attacks", by Thomas Weigold, Thorsten Kramp, Reto Hermann, Frank Wiring, Peter Buhler, Michael Baentsch. In P. Lipp, A.-R. Sadeghi, and K.-M. Koch (Eds.): TRUST 2008, LNCS 4968, pp. 75-91, 2008. Springer-Verlag Berlin Heidelberg 2008.

BRIEF SUMMARY OF THE INVENTION

According to a first aspect, the present invention is embodied as a method for executing software modules on a computer, the method comprising:
  executing a bootloader, at least partly at the computer, preferably in a main memory thereof;
  upon execution of the bootloader:
    accessing:
      requirements as to an initial set of software modules; and
      hardware specifications of the computer,
    determining within said initial set, one or more candidate sets of software modules that are compatible with said hardware specifications and can be stored as a RAM disk; and
    storing the software modules of a final set on a RAM disk, the final set being one of the one or more candidate sets, and instructing to execute the software modules stored on the RAM disk,
wherein each of the initial set and the final set of software modules comprises application components and operating system image components, and preferably further comprises hardware component drivers.

In embodiments, the bootloader is initially stored on a user trusted device connectable to the computer, the method further comprising, prior to executing the bootloader, a step of:
  upon connection of the user trusted device to the computer, letting at least part of the bootloader be transferred into the computer, preferably into the main memory of the computer, for subsequent execution of the transferred part.

Preferably, the software modules are initially stored on a user trusted device, the latter connectable to the computer, the method further comprising, prior to storing the software modules on the RAM disk, a step of:
  transferring software modules of the final set from the user trusted device to the main memory of the computer for subsequent storage and execution of the transferred software modules as a RAM disk.

In preferred embodiments, the method further comprises, prior to storing and instructing to execute software modules as a RAM disk, a step of:
  identifying one final set of software modules out of several candidate sets of software modules, according to inputs received from the user trusted device, preferably thanks to a part of the bootloader executing at the user trusted device interactively with another part of the bootloader that executes in the computer, preferably in the main memory of the computer. Typically, this is carried out thanks in part to user interaction via a display and I/O capabilities built into the user trusted device.

Preferably, determining one or more candidate sets of software modules that can be stored as a RAM disk comprises prioritizing software modules, preferably prioritizing software modules that are the most security sensitive according to a given security criterion.

In embodiments, the method further comprises:
determining an additional set of software modules that are not in the final set of software modules to be executed on the RAM disk; and
storing software modules of this additional set, preferably encrypted, on a physical storage medium of the computer, for subsequent execution.

Preferably, accessing hardware specifications of the computer comprises performing tests in respect of one or more of:
a capacity of the main memory of the computer;
a processor architecture of the computer;
a capacity of a storage medium of the computer; and
whether virtualization is supported,
and, preferably, at least some of said tests are logically linked to software modules of the initial set; and, more preferably, determining one or more candidate sets of software modules that can be stored as a RAM disk comprises prioritizing software modules according to outcomes of the tests performed.

In preferred embodiments, the method further comprises:
allocating memory for the RAM disk, preferably prior to determining said one or more candidate sets of software modules that can be stored as a RAM disk;
and the step of storing the software modules comprises:
computing metadata of a file system for the RAM disk according to the software modules of the final set, said metadata specifying which files constituting these software modules are to be stored and where they are to be stored on the file system;
writing the metadata to individual memory sections, for example memory blocks, on the RAM disk; and
copying files of software modules of the final set in the file system, one after the other, into the memory sections and according to the metadata.

According to another aspect, the present invention can be embodied as a bootloader, executable at least partly at a computer, preferably in a main memory thereof, and configured such that execution of the bootloader cause to:
accessing requirements as to an initial set of software modules and hardware specifications of the computer,
determining, within said initial set, one or more candidate sets of software modules, that are compatible with said hardware specifications and can be stored as a RAM disk; and
storing the software modules of a final set on a RAM disk, the final set being one of the one or more candidate sets, and instructing to execute the software modules stored on the RAM disk,
wherein each of the initial set and the final set of software modules comprises application components and operating system image components, and preferably further comprises hardware component drivers According to still another aspect, the invention is embodied as a user trusted device, comprising:
a connection interface enabling connection with a computer; and
a persistent memory storing:
the bootloader according to the invention; and
preferably, software modules, which comprise application components, operating system image components, and preferably hardware component drivers.
Preferably, said persistent memory comprises
a secure memory, onto which is stored a first portion of the bootloader; and
a non-secure memory, onto which is stored a second portion of the bootloader.

In preferred embodiments, the second portion of the bootloader resides encrypted on the non-secure memory, a corresponding encryption key or decryption key being stored on the secure memory.

In addition, the persistent memory may for instance store software module tests for determining whether said software modules are compatible with said hardware specifications and can be stored as a RAM disk, wherein, preferably, the software module tests are logically linked to said software modules.

Preferably, the bootloader is further configured to cause, as part of software module tests for determining whether said software modules are compatible with said hardware specifications and can be stored as a RAM disk, to:
instruct a processor of the computer to execute virtualization sensitive code and to issue completion data upon completion of execution;
determine, based on such completion data whether the execution was performed in a virtualized environment; and
determine said one or more candidate sets of software modules also according to whether the execution of the virtualization sensitive code was performed in a virtualized environment.

In embodiments, the bootloader is further configured to cause, as part of software module tests for determining whether said software modules are compatible with said hardware specifications and can be stored as a RAM disk, to:
map firmware data to a code, the firmware data comprising program code of an initialization firmware and/or data accessible by the initialization firmware of the computer;
attest trustworthiness of the code; and
determine said one or more candidate sets of software modules also according to whether the code is attested.

According to another aspect, the invention is embodied as a system comprising: a user trusted device according to the invention and the computer to which the user trusted device is connectable.

Devices, apparatuses, systems and methods embodying the present invention will now be described, by way of non-limiting examples, and in reference to the accompanying drawings.

BRIEF DESCRIPTION OF SEVERAL VIEWS OF THE DRAWINGS

FIGS. 3.A and 3.B are flowcharts illustrating high-level steps of methods for enabling a computer to boot from a user trusted device, according to embodiments. FIG. 3.B illustrates a possible series of steps to implement step S5$ii$ of FIG. 3.A. Acronyms BL, HW and SMs respectively stand for bootloader, hardware and software modules;

DETAILED DESCRIPTION OF THE INVENTION

The following description is structured as follows. First, general aspects of embodiments of the invention are described (sect. 1). The next sections respectively address preferred scenarios and technical implementation details of some specific embodiments (sect. 2 and 3).

1. General Aspects of Embodiments of the Invention 1.1 General Aspects of Computerized Systems and Devices Suitable for Implementing Embodiments of the Invention FIG. 1 represents a general computerized system, suited for implementing method steps as involved in embodiments of the invention.

It will be appreciated that the methods described herein are largely non-interactive, and automated by way of computerized systems, such as servers or embedded systems. In exemplary embodiments, the methods described herein can be implemented in a (partly) interactive or non-interactive system. These methods can further be implemented at least partly in software, firmware, hardware, or combinations thereof. In exemplary embodiments, the methods described herein are implemented at least partly as executable programs (e.g., being part of a bootloader) and is executed at least in part by a special or general-purpose digital computer, such as a personal computer, workstation, minicomputer, or mainframe computer. The most general system 100 therefore includes general-purpose computer 101.

Figure 1:
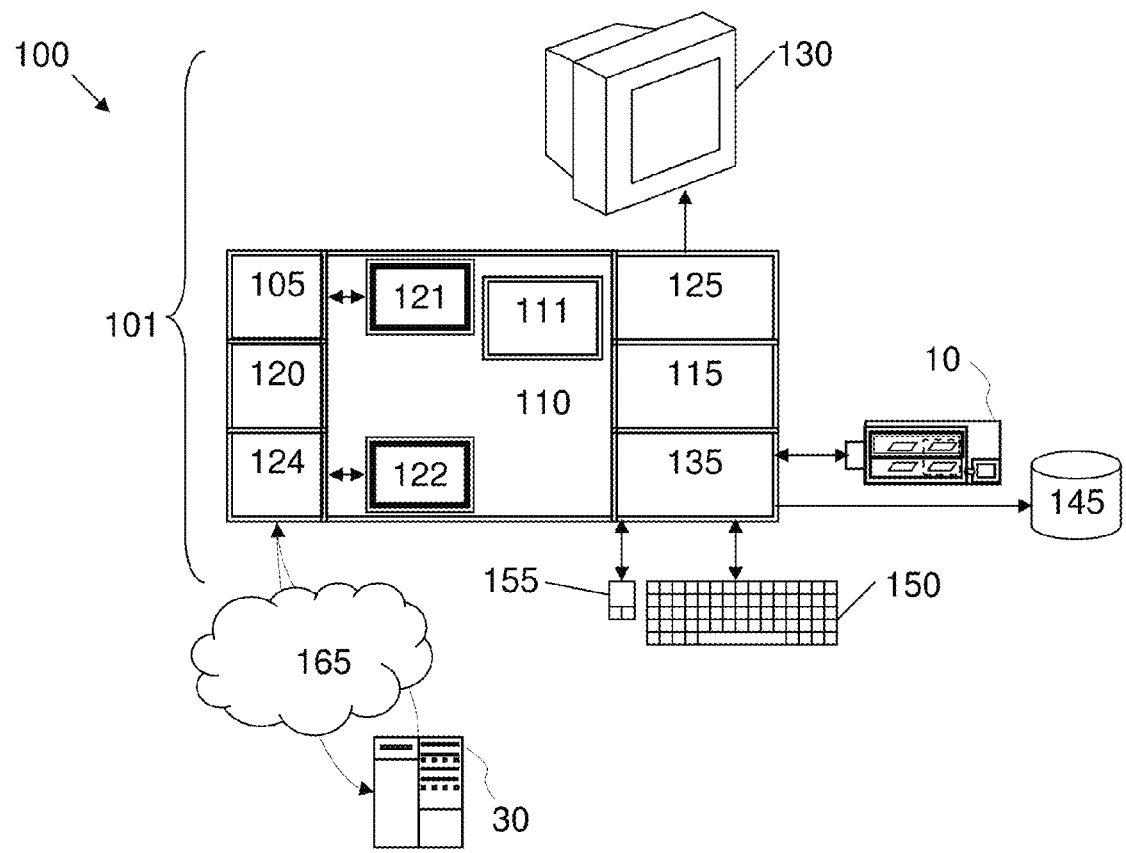
FIG. 1 schematically represents a general purpose computerized system, suited for implementing one or more method steps as involved in embodiments of the invention.

In exemplary embodiments, in terms of hardware architecture, as shown in FIG. 1, the computer 101 includes a processor 105, memory 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art. One of these devices is a user trusted device 10, discussed below in detail.

The processor 105 is a hardware device for executing software, particularly, software that is stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The main memory 110 includes volatile memory elements (e.g., random access memory (RAM, such as DRAM, SRAM, SDRAM, etc.)) and possibly nonvolatile (persistent) memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate or link to electronic, magnetic, optical, and/or other types of storage media. Note that the memory 110 can have a distributed architecture, where various components are situated remote from one another, but can be accessed by the processor 105. In particular, memory 110 is designed such that a RAM disk 121 can be mounted thereon. Similarly, other memory portions can be allocated to specific purposes, e.g., to receive components of a bootloader 16, 17, such as a main module 16, a verification module/processor instruction module (or PIM) 17, for subsequent execution.

In operation, software/program code involved in embodiments of this invention, for instance software/program code to be transferred to memory 110, may include one or more separate programs, each of which comprises a listing of executable instructions for implementing logical functions. In the example of FIG. 1, memory 110 may be loaded with instructions for enabling the computer 101 to start and complete booting from the user trusted device 10.

The software modules to be stored on a RAM disk may comprise application components and operating system image components, and preferably hardware component drivers too. The memory 110 may thus be set in condition to execute a suitable operating system (OS) 111 (preferably a special-purpose OS, or SPOS). Notwithstanding, the novel methods discussed here operate at least partly "before" any OS component be fully loaded at the host 101. At least some of the steps operate at another level, closer to hardware, whereby the normal behavior of the computer 101 is impacted). Upon (and if) executing, the OS 111 shall essentially control the execution of application programs, and provide scheduling, input-output control, file and data management, memory management, and communication control and related services.

At least part of the methods described herein may be in the form of a source program, executable program (object code), script, or any other entity comprising a set of instructions to be performed. When a source program, then the program needs to be translated via a compiler, assembler, interpreter, or the like, which may or may not be included within the memory(ies) of the device 10 and/or the host 101. Furthermore, the methods can be written as an object oriented programming language, which has classes of data and methods, or a procedure programming language, which has routines, subroutines, and/or functions. In all cases, the novel methods discussed herein are designed so as to operate properly in connection with the firmware 122, where needed, and with the device's CPU 11, as needed.

In exemplary embodiments, a conventional keyboard 150 and mouse 155 can be coupled to the input/output controller 135. Other I/O devices 145 may include, for example a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. As described herein the I/O devices 140, 145 can be any generalized cryptographic card or smart card known in the art. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems, e.g., a server 30. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) or any similar initialization software 122. The BIOS is a set of essential software routines that initialize and test hardware at startup. It is otherwise generally able to start an OS, and support the transfer of data among the hardware devices. The BIOS is typically stored in ROM so that the BIOS can be executed when the computer 101 is activated.

For the purpose of implementing methods as described herein, the BIOS 122 can be used (interacted with) notably to initiate the boot process and complete it, as well as, possibly, to initiate a communication over a network. More generally though, any suitable firmware 122 or interface to a firmware (i.e., a combination of persistent memory and program code and data stored therein, which operates "below" any OS 111 in the software stack), can be used to that aim. This typically is the BIOS. However, examples of suitable firmwares 122 or interface thereto include a Preboot eXecution Environment (PXE) BIOS, the so-called Extensible Firmware Interface (EFI) BIOS or, still, the Unified Extensible Firmware Interface (UEFI). The latter is a specification that defines a software interface between the operating system and the platform firmware. UEFI is meant to replace the BIOS firmware interface, present in all IBM PC-compatible computers today. In practice, UEFI provides the same and even more functionality than a traditional PC BIOS and can be used as well. More generally, any initialization firmware operating below the operating system in the software stack may potentially convene for the purpose of implementing the present invention.

When the computer 101 is in operation, the processor 105 is configured to execute software stored within the memory 110, to communicate data to and from the memory 110, and to generally control operations of the computer 101 pursuant to the software. The methods described herein, in whole or in part, but typically the latter, are read by the processor 105, possibly buffered within the processor 105, and then executed.

The portions of the methods described herein that can be implemented in software can be stored on any computer readable medium for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely firmware and/or software embodiment (firmware, resident software, micro-code, etc.) or an embodiment combining firmware/software and hardware aspects that may all generally be referred to herein as "modules", "computerized methods", "processes" or "schemes", etc. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, or partly on the user's computer (as a stand-alone software package), or still partly on two or more of the following: the user's computer 101, the user trusted device 10, and a remote computer 30. The host computer and the server may be connected through any type of network, including: local area network (LAN); wide area network (WAN); connection to an external computer (Internet, using an Internet Service Provider).

Aspects of the present invention are described below with reference to flowchart illustrations and/or block diagrams of methods, apparatus (systems) and computer program products according to embodiments of the invention. It will be understood that at least some of the blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, at least some of the blocks in the flowchart or block diagrams may represent a module, segment, or portion of code, which comprises one or more executable instructions for implementing the specified logical function(s). It should also be noted that, in some alternative implementations, the functions noted in a block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

1.2 Main Embodiments and High-Level Variants

Figure 4:
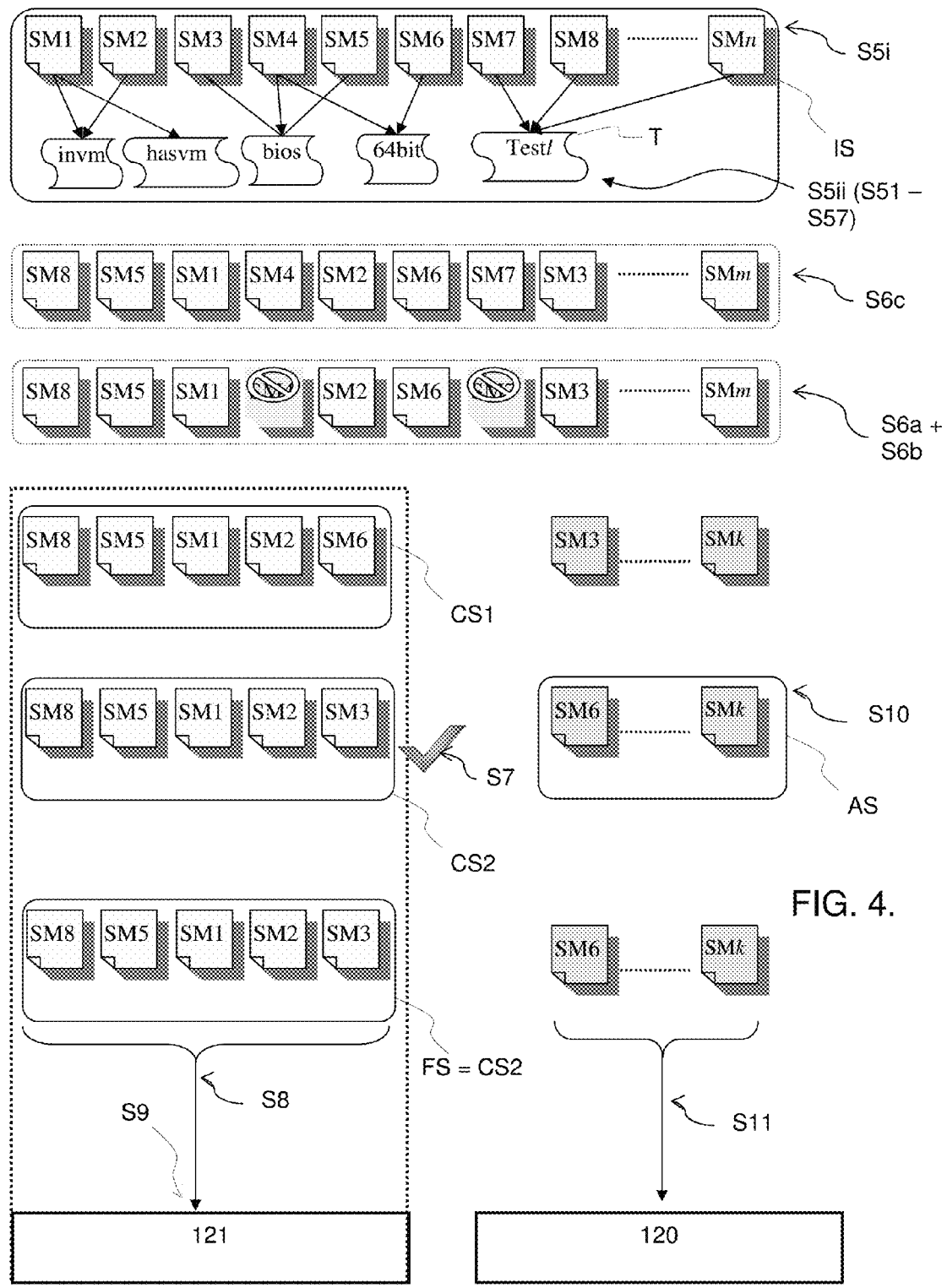
FIG. 4 schematically illustrates a process for determining candidate sets of software modules and storing sensitive software modules on a RAM disk, as involved in embodiments.

In reference to FIGS. 1 to 4, an aspect of the invention is first described, which concerns a method for executing software modules on a computer, wherein the software modules comprises application components, operating system image components, and preferably hardware component drivers too. As illustrated in FIGS. 3 and 4, the method mainly comprises the following steps:

Step S4: Executing a bootloader 16 at least partly in the computer 101, preferably in the main memory of the computer; and Upon execution of the bootloader:

Step S5: Accessing:
requirements (S5$i$) as to an initial set IS of software modules SMn; and
hardware specifications (S5$ii$) of the computer 101, e.g., a PC, Step S6: Determining within said initial set, one or more candidate sets CS1, CS2 of software modules that are compatible (step S6$a$) with said hardware specifications and that can (step S6$b$) be stored as a RAM disk;

Thus, the software modules selected here must on the one hand be compatible with the hardware specifications, and on the other hand be suitable for storage as a RAM disk, which itself shall necessarily depend on the hardware capabilities of the machine 101. Note that the RAM disk may not exist at this stage yet, as it is preferably set up precisely for the purpose of executing the software modules retained. The RAM disk can be set up at any time before storing the modules thereon;

Step S9: storing the software modules of a final set FS on a RAM disk 121 and instructing to execute the software modules stored on the RAM disk. The final set FS is one of the candidate sets CS1, CS2, . . . selected according to e.g., some suitable policy.

The present invention can furthermore be embodied as a bootloader, or any more general computer program code product, which upon execution at the computer 101, allows for achieving the same. What is called bootloader here is a set of software modules 15, 16, 17 (referred to as "components", or "parts", to distinguish them from the software modules SMn to be stored as a RAM disk) that can perform various operations, upon execution at the computer 101, and possibly interactively with components 15 thereof executing at the device 10, to boot the computer 101. Typically, the bootloader (or at least a part thereof) is detectable by the initialization firmware, e.g., the BIOS 122. It notably comprises instructions for the firmware 122 to initiate a transfer of at least some of its components 16, 17 onto the PC 101 for subsequent execution at the PC. The bootloader components 15, 16 and 17 can be regarded as a single entity (i.e., a boot-enabling entity) or as separate entities capable of interacting for providing the desired result.

Each of the initial set IS and the final set FS (as well as the candidates set CS1, CS2, . . . ) of software modules SMm comprises application components and operating system image components and preferably hardware component drivers too, for the purpose of interacting with the computer's hardware and allow, upon execution, application to be executed and hence a user to perform activities via the computer. Since modules are executed directly as a RAM disk, the above method allows for executing an operating system and application softwares running on said operating system on computer 101 while leaving little or even no trace thereon. Basically, this solution makes it very difficult (if not impossible) to conclude, by inspecting the hard disk or a mass storage device connected thereto, that a user was using said computer, after the end of a session. Yet, the real purpose of the present solution is to provide a secure solution to ascertain the integrity of the application software running on the operating system, including the assets that this software manages (e.g., secret corporate data, confidential information, proprietary data, formats and information, etc.). The above solution is reliable, i.e., user-verifiable, and portable, i.e., not machine-specific.

Preferably, rather than a GPOS, a special-purpose OS (SPOS) and applications are relied upon to provide integrity assurance. The software modules SMn may be accordingly pre-selected.

As it would likely not be acceptable for users (particularly in Bring-your-own scenarios, i.e., when users utilize their private PC hardware for corporate work) to delete their private GPOS, embodiments shall consist of temporarily booting into a SPOS, e.g., via a mechanism tightly controlled by PC-external cryptographic hardware. This is achieved thanks to a user trusted device, as explained below in detail.

The proposed solution can run solely out of RAM, i.e., transient data and automatically vanish without trace when the user reboots into his private GPOS again. Complementarily to execution of selected modules (e.g., the most sensitive modules) as a RAM disk, the SPOS may also utilize the PC-local hard disk for additional storage of less critical applications and application data or utilize remote (cloud) storage for that purpose. In that case, the system needs to make room on the local hard disk; take ownership of a hard disk area; and then can work without network connectivity. In variants, the PC may need to be online to give the SPOS the ability to connect to a cloud server.

The requirements as to the initial set IS of software modules can be initially expressed in terms of activities that a user intends to have or is allowed to have on the PC and how/where to perform them. These activities are for example:
- e-banking applications, wherein client account information is accessed, and possibly client assets are accessed/managed; or
- secure messaging systems application.

These requirements are then translated in terms of software modules, i.e., those modules that are necessary to perform such activities. A simple look-up table may suffice to translate activities into software modules. Other correspondence principles may be used. In variants, the requirements are directly provided in terms of software modules.

Typically the software modules are high-level software components, i.e., higher-level than the initialization software, i.e., the BIOS system.

A RAM disk is known per se. Broadly, a RAM disk is the same as a hard disk, except that it uses volatile RAM as storage medium. Both a hard disk and RAM disk provide storage in the form of a sequence of bytes. On a hard disk this sequence is divided into blocks of a certain size, hence each byte can be addressed by a block number and offset of the byte therein. When storing data in RAM disk instead of a hard disk, data blocks are usually simply stored contiguously in RAM. Assuming for instance that a RAM disk has a block size of 512 bytes and that one wishes to store a first block (having index 0), e.g., at address 512000, then one would store a second block (indexed block 1) at address 512512, a third at 513024 and so on. When one needs the nth block (indexed n−1): instead of instructing a hard disk to read block n, here one simply reads 512 bytes of main memory, e.g., at address 512000+512*n in the above example.

The way the data is organized in either form of disk can be and frequently is the same. Practically though, there are different implications. When one reads a block from the disk, this block has to be first copied into the RAM. When one reads it from the RAM disk, since the blocks are already stored in RAM, a reasonably well-designed OS does not have to copy the block to another area in RAM, it can instead read the block in situ.

In addition, on hard disks, one typically tries to achieve an organization such that files begin at a block boundary, making it easier to read and write to it. While maintaining such a structure helps simplifying organization on a RAM disk as well, it is not mandatory to preserve this structure on a RAM disk. Thus, not imposing this structure would allow to store files more compactly and to preserve memory. On a hard disk this would be prohibitively expensive because one always has to read and write entire blocks. This is because on hard disks if one wants to change part of a block, one has to first read the entire block, then change it partly, and then write back the entire block as modified. In RAM disk, only the required part needs be changed.

Furthermore, on a hard disk, blocks are as possible allocated in sequence so that when the disk rotates below the read head of the hard disk, blocks can be accessed one after another. If blocks are not allocated in sequence, the hard disk has to seek each block, at the cost of a prohibitively long time. A similar effect exists for a RAM disk, but the penalty is almost negligible in comparison.

RAM disks are frequently used for reading data only. In this case, data can be organized differently, e.g., as in a CDROM. There is no need to mark unused blocks, because data are not written and there is no need to find unused blocks for new data.

Therefore, as discussed above, relying on a RAM disk rather than a physical disk has several technical implications.

Referring back to the main steps of the proposed method, note that the algorithm for finding which software modules that can be stored as a RAM disk will be much improved if the determination step decomposes into two sub-steps:
- First, one determines, within the initial set, a first subset of software modules that are compatible with said hardware specifications; and
- Second, one determines, within said first subset, one or more second subsets of software modules that can be stored as a RAM disk. This way, only those technically relevant software modules are considered as possible candidate for being executed as a RAM disk.
- Other sub-steps might in fact be involved, as discussed later.

Figure 2:
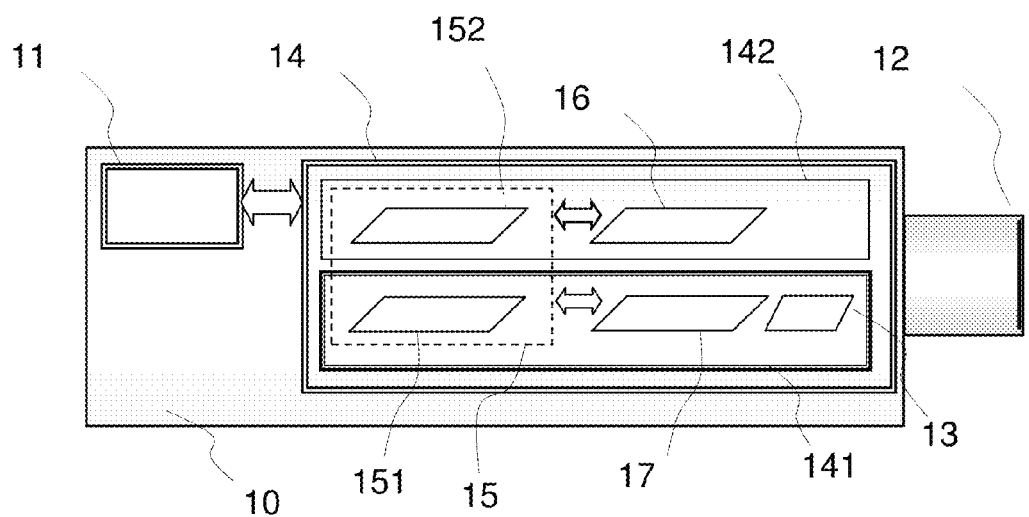
FIG. 2 schematically illustrates selected components of a user trusted device, as involved in embodiments.

Referring now to FIGS. 1, 2 and 3, in embodiments of the above method, the bootloader components 15, 16, 17 are initially stored on a user trusted device 10. An example of suitable device is the so-called Zone Trusted Information Channel device evoked in introduction. This way, improved guarantees are provided as to the temporary booting of the machine 101. For example, an employer can easily keep control of the bootloader present on the device and tight cryptographic control can otherwise be provided on the device, independently from the PC, which may not be provided by the employer but instead belong to the employee.

Note that aside embodiments of the above method (that optionally make use of a user trusted device), the present invention may be embodied as a user trusted device 10, equipped with the bootloader 15, 16 described above, or even as a more general system 100, comprising this device 10 and a computer 101, to which the device 10 is connectable.

Although the device 10 is preferably a secure device, i.e., equipped with a secure memory, this needs not necessarily be the case. Other aspects of the user trusted device shall be discussed later. The device 10 provided (step S1) is connectable to the PC 101. Then, upon connection (step S2) of the user trusted device to the computer, at least a part 16 of the bootloader is transferred (step S3) into the main memory 110 of the PC 101 for subsequent execution S4 of the transferred part 16.

This transfer is typically instructed by or via the initialization firmware 122, e.g., the BIOS. As the bootloader is preferably only partly transferred (e.g., a component 16 thereof is transferred to the PC), its subsequent execution may thus be carried out partly at the PC (e.g., in interaction with the firmware 122), and partly 15 at the user trusted device, both parts 15, 16 executing interactively.

Note that, in variants, the bootloader component 16 transferred to the PC may also be executed at a graphic card or any suitable extension card of the computer, depending on the types of satellite processing means available. A concurrent (yet interactive) execution partly at the computer, partly at the user device is desired, notably in some of the embodiments described below.

The software modules SMn too may initially be stored on a user trusted device 10. In that case, the software modules finally retained (i.e., of the final set FS) shall be transferred (step S8) from the user trusted device 10 to the main memory 110 of the PC for subsequent storage and execution as a RAM disk. In variants, the software modules could be stored on a remote server or even locally on the PC and their integrity verified using cryptographic checksums or the like. In the former case, an additional communication step is required to contact the server, even though no OS is running yet. A specific method shall be discussed later, which makes this possible.

The booting process may thus complete by:
loading the finally retained software modules from the user trusted device (or another source, the local computer, network, etc.); and
preferably decrypting them, before
storing said modules as a RAM disk and executing them.

Note that, in terms of chronology, the software modules SMm are transferred prior to storing the software modules on the RAM disk but preferably after having determined which potential sets of software modules that, on the one hand are compatible with the hardware specifications and, on the other hand, are suitable for storage as a RAM disk.

Preferably, this is the bootloader executing on either side, i.e., computer or user device that most conveniently instructs to transfer the software module of the final set (possibly by involving the BIOS 122).

Referring now more specifically to FIGS. 3 and 4, embodiments of the above method may further comprise a step S7 of identifying one final set FS of software modules out of several candidate sets CS1, CS2 of software modules, this, prior to storing and instructing to execute the software modules as a RAM disk.

This identification S7 may be carried out according to inputs received (step S7b) from the user trusted device 10, and this, preferably thanks to that part 15 of the bootloader executing at the trusted device 10 (interactively with the part 16 that executes at the PC).

Different types of user inputs are possible. The user may be instructed to specify whether software modules are to be stored in RAM only or can also be stored on the local computer's hard disk. Additional user input may be requested, e.g., during execution of any test T, for instance tests T logically linked with software modules SM. For example, additional input could be associated to a localization test ("Are you currently residing in Switzerland/Is your company located in Switzerland?"). Such information, however, may also be inferred through other means such as GPS devices, IP network-to-country mappings, etc. Still another input could relate to whether a company PC was detected, etc.

If multiple possible sets of modules (candidate sets CS1, CS2, . . . ) have been found, further steps are required to determine which set FS to retain finally. Further user interaction or policy checking may be used to that aim. Inputs to validate the final set may for instance come after submitting (step S7a) the candidate sets to the user for validation or based on a user's choice communicated at any previous stage, or even based on a default choice, preferably user modifiable.

The additional user interaction (e.g., user selects the final set FS in a list, thanks to control buttons on the device 10 and a display) is preferably performed via the same device 10 otherwise used for booting the machine, e.g., thanks to the part of the bootloader 15 executing at the device 10 interactively with the part 16 that executes at the PC 10. Still, the decision as to which final set FS to retain could be made automatically by other modules, e.g., some hardware trustworthiness attestation modules or virtualization checking modules 17, which will be described later. Using device 10 to that aim is preferable, because one may want to be able to enable/disable certain activities based on the trust one has on the machine 101, and its state. And in what extent the machine can be trusted may vary considerably, especially in a BYO scenario.

For example, one may allow a send-email functionality only, even if it is concluded that the PC cannot be (fully) trusted, and e.g., make it possible to verify the email through the device 10.

In variants, policy checking may help to identify an optimal final set FS of software modules, with or without any further user interaction. Also, user interaction could be involved independently from the trusted device 10 used for booting the machine: for example, the user may be prompted to select a final set FS of modules directly at the PC, during the boot process.

In embodiments, the determination step S6 of the candidate sets CS1, CS2, may comprise prioritizing (step S6c) the software modules, according to any suitable criterion. This prioritization may depend on the outcomes of tests carried for the software modules, as to be discussed later. Preferably, software modules that are the most security sensitive are given priority for being stored as a RAM disk. The security criteria could for instance be based on the following considerations, namely, whether:
1. Security sensitive data may be modified;
2. Security sensitive data may be read; and/or
3. No security sensitive data may be accessed in any case.

For instance, the user's intent as to such sensitive data (e.g., whether such sensitive data are only to be read and not modified) may be queried through the user-trusted device and based on this input, software modules SM stored on the user trusted device may be disabled, i.e., not loaded in the computer.

Other criteria may be defined depending on the company policy, such as data putting individual projects at risk over putting the whole company at risk. There are many other possible examples. The present embodiments are not limited to any specific policy scheme; choosing appropriate policy schemes is essentially orthogonal to the present invention.

While the most sensitive software modules shall likely be stored and executed as a RAM disk, it remains that embodiments of the proposed method may use other memory support, complementarily to the RAM disk, as touched earlier. For instance, as illustrated in FIG. 3.A or 4, an additional set AS of software modules may be determined (step S10), which set AS comprises modules that are not in the final set FS of software modules retained to be executed on the RAM disk. The software modules of this additional set are then stored, step S11a, preferably encrypted, on a physical storage medium 120 of the computer, for subsequent execution (step S11b), if needed. Thus, more flexibility can be provided as to the choice of software modules executed at the PC, even in contexts where RAM disk capabilities are limited (e.g., limited memory can be allocated to the RAM disk). Whether to determine this additional set of modules may be decided based on additional user input or on policy.

In variants, the software modules of the additional set could even be left on the user-trusted device itself (the latter being a sort of physical storage medium 120 of the computer anyway, once it has been attached to the computer) and executed from there. However, since execution on that device is typically slow, it is preferred to store the software modules of the additional set on a secondary storage 120, i.e., "closer" to the main memory, and not on a tertiary storage.

Next, referring to FIG. 3, more shall be said about the hardware specifications accessed at step S5*ii* for the purpose of determining the candidate sets CS1, CS2 (step S6). Generally, present methods may use an outcome of an assessment of the hardware specifications, for instance provided by an external entity performing this assessment, as illustrated in FIG. 3.A. Preferably yet, this assessment is part of the method, as illustrated in FIG. 3.B, which illustrates possible steps to implement step S5*ii* in FIG. 3.A. In both cases, accessing hardware specifications of the computer may comprise a number of tests T (see FIG. 4 for an illustration), as depicted in steps S51.1 of FIG. 3.B.

At least part of the tests T to be performed may be provided independently from the software modules and even executed prior to access the user requirements S5*i*. Preferably though, each software module SM1, SM2 . . . as provided in the initial set IS comprises not only the software to be executed (e.g., by the user) but also meta-data, describing the tests T to be executed before the software module may be used (or logical links to these tests), as symbolically represented in FIG. 4. The tests T are thus logically linked to the software modules, in embodiments.

Note that such tests T may be provided as conditions to be evaluated, rather than tests to be performed (both tests and conditions are referred to as "tests" herein). Thus, each software module may comprise tests associated therewith, that lead to determine whether and where the software module could be stored, e.g., in volatile memory (computer's RAM), on persistent memory (such as a hard disk), or may not be accessed at all by the computer to which the user trusted device 10 is connected too. As can be seen in FIG. 3.B and FIG. 3.A, the outcome of the above test executions (or condition evaluations) gives rise to various outcomes that shall subsequently be used, and notably at step S6.

As touched above, instead of storing tests T for each software modules (e.g., embedded therewith), the tests are preferably provided as executable program code to be executed and are stored separately from the software modules. The tests can nonetheless identified through an identifier or pointer and the software modules SMi only refer to the corresponding identifier or pointer. This has the advantage that each test is only stored once even if it is shared among multiple software modules. This is illustrated in FIG. 4.

Note that tests T logically linked to software modules (as depicted in FIG. 4) may have a global interest, concerning other software modules. In that case, redundancy of test execution can be avoided by testing whether the test has already been evaluated, steps S51.1.1 and S51.1.3 in FIG. 3.B. Thus, once a general test has been performed there is no need to do it again. Thus, some of the tests could be mapped to software modules (or not) but there is no need to repeat what has been done already.

In detail, FIG. 3.B illustrates an example of steps to determine what software modules may be used and where to store them (on the computer's disk or just a RAM disk), in a context where the tests are logically linked to software modules (each software module may be associated with one or more tests, as reflected in FIG. 3.B or 4).

First, S51, a first software module (or the first one of the remaining modules) that can be used through the user trusted device is selected. Next, a first test associated with this software module is selected, S51.1. As said above, it is checked whether this same test has already been executed (S51.1.1). If so, the corresponding results are retrieved, S51.1.3. If not, the test is run on the computer, S51.1.2 and the outcome of the test is stored, S51.1.4. If there is another test to be executed, S51.1.5, this test is then selected, S51.1.6, such that each test corresponding to the software module is executed.

Once all the tests have been executed, a condition that is part of the software module is evaluated, S51.2, which subsequently informs the bootloader as to whether said software module may be stored on the computer, on persistent or volatile memory (or potentially both). After this decision has been noted, S51.3-5, the same steps are repeated for all subsequent software modules SM, S51.7.

As an example of a global test, perhaps the most important hardware specification that needs to be accessed concerns the capacity of the main memory of the computer, since the latter determines in turn what memory can be allocated to the RAM disk. Yet, in some scenarios where limited applications are allowed (e.g., as per policy), only a limited memory would suffice, such that testing the capacity of the main memory could be simply skipped. Similarly, in other scenarios, this capacity could be known in advance, or still predicted.

Other global hardware specifications that can usefully be tested are:
- the processor architecture of the computer (e.g., 32 vs. 64-bit, "64 bit" in FIG. 4);
- the capacity of a storage medium 120 of the computer; and
- whether virtualization is supported ("hasvm" in FIG. 4). Note that this test differs from checking whether the computer is (already) running within a virtual environment ("invm"), which may be a security risk, as to be discussed below. Rather, the "hasvm" test checks whether the computer allows to start a virtual computer, i.e., that would remain under control of the present methods, and have software executed within that virtual computer, for the purpose of implementing part of the present methods.

In addition, other tests that could be performed may be:
Where is the computer located (misc test)
What does the user want to do (only read data, or modify data)

Preferably, the above hardware capabilities are tested after performing two other types of tests, namely (i) checking the trustworthiness of the machine ("bios" test in FIG. 4) and (ii) whether the machine already is under a virtualized environment ("invm" test in FIG. 4). This is because it may not be useful to test hardware capabilities if the machine cannot be trusted. Conversely, information as to the hardware specifications may already be available from the beginning of the boot process, or precisely from prior steps of checking the trustworthiness of the machine or testing whether the machine is under a virtualized environment. More generally, hardware capabilities can be tested/obtained at different stages of the process, notwithstanding the ordering assumed in FIGS. 3.A and 4.

At present, more detailed aspects of the RAM disk allocation are discussed in reference to FIGS. 3.A and 5. Most generally, and as described earlier, any method suitable for storing and executing software modules on a RAM disk can be contemplated, for the purpose of implementing step S9. Two main variants are discussed in the following. While the first variant is slightly more complex to implement than the first one, it allows more compact file storage on the RAM disk.

First, both variants shall involve a step S9*a* of allocating memory for the RAM disk, as implicit from RAM disk usage in general. Notwithstanding the depiction in FIG. 3, this memory allocation shall preferably be performed prior to step S6, i.e., prior to determining the candidate sets CS1, CS2 of software modules, since the memory allocated to the RAM disk shall in turn determine how many/what software modules can effectively be stored as a RAM disk. Preferably too, this memory allocation is performed after having obtained information concerning the capacity of the main memory of the computer, since the latter determines what memory can be allocated to the RAM disk, as touched earlier. Still, in some scenarios, e.g., where limited applications are allowed (e.g., as per policy), a limited, predetermined RAM disk memory could suffice, such that the RAM disk memory allocation could be performed even after having determined the candidate sets CS1, CS2, which can be constrained to fit into the predetermined RAM disk memory. In that case, memory can be allocated to the RAM disk at step S9*a*, as represented in FIG. 3, in accordance with the predetermined RAM disk memory.

Essentially, in the first variant, the step of storing the software modules decomposes into the following sub-steps:

First, step S9*b*, metadata MD1 of a file system 121*fs* (for the RAM disk) are computed in accordance with, i.e., based on the software modules affectively retained in the final set FS. These metadata specify which files (the software modules') are to be stored and where they are to be stored on the file system, and more precisely which files are to be stored in which memory sections of the RAM disk. The originality of the first variant is that the metadata are computed upfront, in consideration of files to be stored later on memory sections of the RAM disk. In other words, the architecture of the RAM file system is at least partly based on the specific files to be stored later on, rather than being a general architecture to which these files must conform to, at variance with common RAM disk file system construction methods.

Figure 5:
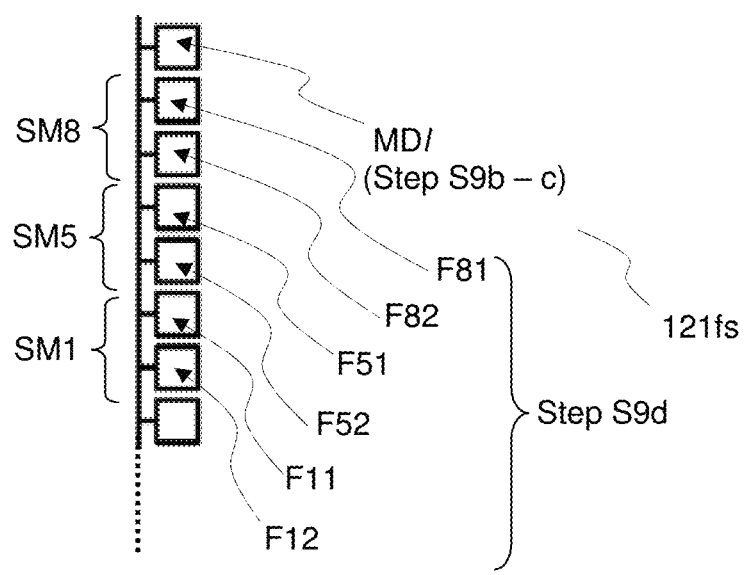
FIG. 5 schematically illustrates an abstract representation of a given memory section of a file system of a RAM disk.

Second, the metadata are written (step S9*c*) to individual memory sections, e.g., memory blocks (or data block); and Finally, files Fij of the software modules of the final set are copied (step S9*d*) in the file system, one after the other, into memory sections and according to the metadata MD1. For illustration, FIG. 5 is an abstract representation of a portion of the RAM space available. At steps S9*b* metadata are computed which notably includes metadata MD1. At step S9*c*, metadata MD1 are written to their respective memory block. Then, step S9*d*, files are copied to the memory blocks, according to metadata MD1. In FIG. 5, since software modules SM8, SM5, SM1, etc., have been retained (see FIG. 4) as the most sensitive modules (compatible with both the hardware capabilities of the machine and a RAM disk implementation), their corresponding files (assuming only two files per module for intelligibility) are copied one after the other (F81, then F82, then F51, etc.). Note that Steps S9*c* and S9*d* could be performed in any order, in parallel, etc.

For example, assume that, like in the example of FIG. 5:
The two files F81 and F82 of the first software module SM8 retained, have each a size of 20000 bytes; and The two files F51 and F52 of the second software module SM5 retained have each a size of 7000 bytes.

Assume now that the metadata MD1 consumes 2000 bytes. Then, the metadata MD1 would essentially tell:
Byte 0: metadata MD1:
F81, starts at byte 2000, size 20000
F82, starts at byte 22000, size 20000
F51, starts at byte 42000, size 7000
F52, starts at byte 49000, size 7000
Etc.
Thus, at step S9*d*:
File F81 is copied at byte 2000;
File F82 is copied at byte 22000;
Etc.

The actual layout may look slightly different in practice, e.g., to adhere to memory alignment requirements. However, the description of the first variant above illustrates essential aspects of the layout. In particular, one possible data sequence that may result is:
MD1
F81
F82
F51
F52
F11
F12
Etc.

Another possible ordering would consist of splitting metadata, i.e.,
MD81
F81
MD82
F82
MD51
F51
MD52
F52
MD11
F11
MD12
F12
Etc.

As exemplified above, no metadata is computed and stored a posteriori in respect of each file copied, as common RAM disk filesystems do. Indeed, and according to this second variant, one proceeds as follows:
a. Allocate memory for the RAM disk
b. Create a filesystem on the RAM disk, e.g., like common operating systems use for user data;
c. Copy the files from the individual modules to the RAM disk, e.g., like one would copy files in a common GPOS. This way the metadata are created incrementally while copying the files. However, the data cannot be stored as efficiently as in the former variant where all the file sizes are taken into account a priori and an optimal layout is computed. The second variant merely results in a structure similar to the following, if, for instance, a standard FAT32 filesystem is used for the ram disk.
File-system meta data;
File-allocation table (FAT) that indicates which blocks are occupied by files and the blocks occupied by each file; and
Blocks of meta-data for each directory, file, and blocks of individual files potentially interleaved in any order as indicated by the file-allocation table (FAT).

The outcome of the previous variant is more compact than the outcome of common RAM disk filesystems, a thing that allows for saving substantial RAM memory, because unallocated blocks do not have to be tracked and hence no file-allocation table (FAT) or similar technique needs to be used. To summarize: the second variant is simpler to implement than the first variant. On the other hand, it provides less efficient memory management. Still, hybrid solutions combining aspects of the two variants above can be contemplated.

The computation required for the RAM disk implementation shall preferably be carried out on the computer 101 itself. In variants, this can be done also on the user trusted device 10: a pre-built RAM disk image would be transferred to the computer in that case. Yet another option would be to pre-compute all the possible sets of software modules CSp and store each set as a separate possible image on the user trusted device. However, doing so would lead to store the modules probably multiple times, which is not desirable in most common situations. Still, such an option can be contemplated when it is known there will only ever be a maximum of e.g., two or three possible sets.

As evoked earlier, the present invention can also be embodied as a bootloader 15, 16, executable at least partly in the main memory 110 of computer 101, and configured such that, execution of the bootloader, cause to take the steps already discussed above in reference to the method (starting with the main steps S5, S6 and S9).

In addition, the invention can further be embodied as a user trusted device 10, such as depicted in FIG. 2, or as a computerized system 100 (as in FIG. 1) comprising the user trusted device 10 and computer 101, typically a PC, a PC for mobile use, notebook or netbook, or a PDA or a smartphone. The machine 101 is herein referred to as a computer, a host computer or simply PC.

Referring generally to FIGS. 1 to 3, the trusted device 10 (also called external trust anchor) notably comprises:
 a connection interface 12 enabling connection S2 with a computer 101; and
 a persistent memory 14 storing:
  the bootloader, designed such as to enable or trigger the execution of operations already described earlier, at the device 10 and/or at the computer 101, upon connection of the device 10 with computer 101 via said interface 12; and
  preferably too, the software modules, which comprise application components, operating system image components, and more preferably hardware component drivers as well, as well as the tests T to be performed (or solely the logical links to the tests).

This device is typically a corporate or personal secure device, that is, a device that a company or a user owns and controls, such as a USB device, preferably a USB flash drive (a data storage device that includes flash memory, in addition to an integrated Universal Serial Bus (USB) interface), a mobile phone or a personal digital assistant (PDA) that only this user uses or that is owned and controlled by the company this user works for. Typically, this device weighs less than 200 g, preferably less than 60 g and more preferably less than 40 g.

A possibility alluded to earlier is to involve a third party, e.g., a server 30 (see FIG. 1), notably to distribute part or all of the software modules SMn (instead of them being stored on the device 10), or even to help decide what final set FS of modules to retain, etc. In that case, the bootloader is further configured to instruct the device 10 or the computer 101, to connect to the server 30. A "central" server can more easily be updated as to the various possible, ever changing software module components and policy rules.

To that aim, the bootloader may be configured to interact:
 with the initialization firmware 122, to subsequently interact with a network card 124 of the computer 101, and this, in order to initiate a communication over the network 165 (as enabled by the network card 124) and connect to the server 30;
 directly with the network card 124 of the computer 101: this requires accessing network card drivers stored in that case on the trusted device 10; and/or
 with the firmware 122, to partly run an OS of the computer 101, i.e., load the sole components of the OS that are necessary to connect to the server 30 via the PC 101.

Communications between the device 10 and the external entity 30 shall preferably be carried out by means of:
 An HTTP connection from server 30 to device 10 through computer 101;
 End-end authentication; and
 Signature and other encryption data 13, if needed, which can be stored on a secure memory 141 of the device 10.

As an alternative, one may prefer to have the device 10 equipped with network access means, e.g., with a network device (wired or wireless), such as to connect directly to a server. Such a solution is somewhat more expensive. However, latency is reduced since no additional interactions with the computer 101 are needed to contact the server. Here also the communications with server 30 may use end-end authentication and encryption.

Next, referring more particularly to FIG. 2, the persistent memory 14 shall preferably comprise:
 a secure memory 141, onto which a first part 151 (or given portions) of the bootloader 15, 16, the verification module 17, etc., may be stored; and
 a non-secure memory 142, e.g., an SD card, onto which a second part 152 (or other portions) of the same boot enabling module(s) 15-17 may be stored.

The presence of a secure memory makes the user trusted device a "secure" device. When computer 101 requests a given block or any data chunk of the bootloader, then the device's CPU 11 shall be prompted by software residing in memory 14 to decrypt the requested block, e.g., using encryption data 13 stored on the secure memory 141, to provide the requested block. A decryption key alone is sufficient although preferred embodiments use symmetric encryption for this (hence the same key is used both for decryption and encryption).

Preferably, the portion(s) of the boot enabling module(s) 15-17 that reside on the secure memory shall occupy less than half a size of the secure memory, owing to memory constraints. Ideally though, all parts of the boot enabling modules shall occupy as little memory as possible. For instance, some implementations have been successfully tested which use less then 4 ko for each part of the boot enabling modules 15-17 (excluding code to contact a network server which would consume approximately 32 ko, and typically less than 64 ko). Those skilled in the arts will appreciate that code implementing the functionality to contact a remote server can be shared along multiple boot enabling modules stored on the user trusted device 10.

The connection interface 12 of the device 10 may for instance be of the following type:
 Universal Serial Bus or USB;
 External Small Computer System Interface or SCSI;
 External Serial Advanced Technology Attachment or SATA;
 Firewire; or
 Thunderbolt.

More generally though, this could be any current or future connector (wired or wireless) that allows the computer to boot from the external device 10. In addition, the same interface 12 can furthermore allow the user trusted device 10 for communicating with any external device such as a beamer, a printer, or any other output device.

As usual, the user trusted device 10 may be provided with processing means (or computing means, i.e., CPU) 11, such as a crypto Processor, coupled to a memory, which more generally comprises a persistent memory 14 and, preferably, a non-persistent memory too (not explicitly shown but the non-persistent memory can be considered to be part of the processing means 11).

In the present context, the persistent memory notably stores computerized methods, e.g., boot enabling modules 15-17 evoked above, to be executed by the processing means 11, 105. Of course, the boot enabling modules 15-17 evoked herein could be considered as a single module provided with different functions, and able to execute at the device and at the computer.

If necessary, the secure device 10 has a card reader to read user credentials stored on a memory card, e.g., the non-secure memory 142 or any smart card. Suitable use can safely be made out of such data, e.g., user credentials as stored on the card. In particular, a trustworthy connection can be established between a user (or strictly speaking the device 10) and a third party, e.g., server 30, via the host 101 and using such data. In a variant, the user credentials may be stored directly on the secure device. Further usual interfaces (like control buttons and display) may be provided to allow for interaction with the user. Most notably, such trustworthy display on the secure device 10 can be used to obtain user assertions about the environment s/he presently is in. This way, for example, but without limitation, a user can confirm requests by the server 30 to ascertain that s/he is not in a public space such as an Internet café, when starting the computer 101 in order to inform the decision process S7.

As discussed earlier, several tests may be performed to assess the trustworthiness of the machine 101, e.g., before determining what modules should be stored in a RAM disk. A component 17 of the bootloader may be dedicated to that purpose. Beyond the global tests discussed earlier, two types of tests are of particular interest, which are discussed now in detail. The first type of test revolves around executing virtualization sensitive code at the machine 101, to test whether the execution of the virtualization sensitive code was performed in a virtualized environment. This first type of test is briefly discussed now.

Essentially, what is carried out for this type of test comprises the following steps:
  Step S51.1.2: instruct the processor 105 of computer 101 to execute virtualization sensitive code and to issue completion data upon completion of execution; and
  Step S51.2: determine, based on such completion data whether the execution was performed in a virtualized environment; and
  Then, at step S6, the candidate sets of software modules can be determined also according to whether the execution of the virtualization sensitive code was performed in a virtualized environment or not. If a virtualized environment is detected, the choice of available software modules shall likely be limited, or possibly prevented, according to policy rules.

In more detail, assume that the device 10 and a computer 101 are provided (step S1 in FIG. 3). Then, upon connection of the device (step S2), the following operations are preferably performed:
  Computer 101 starts booting from the user trusted device 10;
  Processor 105 is instructed to execute some reference code;
    The code at stake is preferably provided by the device 10 itself, e.g., by the bootloader component 17. In variants, an identifier or still an address of the code could be passed to the processor 105. This code typically include several instructions, which may depend on the (type of) machine tested;
    This code is chosen so as to be sensitive to a virtualized environment and is therefore referred to as a "virtualization sensitive code". Namely, this code executes differently and gives rise to different execution characteristics depending on whether it is executed in a virtualized environment or natively. The execution characteristics can notably differ in:
      A result that is produced from the execution; and/or
      A computational effort, measurable by way of timing characteristics, processor cycles, etc. For instance, a computation that of special interest for x86 based PCs would be to switch between real mode and protected mode.
    As per instruction to the processor, execution of the virtualization sensitive code occurs while computer 101 starts booting, i.e., after the boot process has began and before it completes, i.e., before deciding which software module SMn to load.
    The processor 105 is further instructed to issue some completion data (e.g., a result, a timestamp, or a timestampable event, etc.) upon completion of the execution;
  The next set of operations is to determine, based on the completion data, whether the execution was (not) performed in a virtualized environment (or, equivalently, whether the execution was performed in a safe environment, e.g., natively); and
  Finally, if it is determined that the execution was not performed in a virtualized environment, the process goes further.
    Other conditions may be involved, as discussed below (e.g., the BIOS/Firmware 122 may be tested as well), before going to step S6.
    In embodiments, the question of determining whether the execution was performed in a virtualized environment is indirectly answered, e.g., user-interactivity might be needed, or a connection to a server 30, to delegate part of the assessment and make updated comparisons at the server 30. Three likely scenarios can be envisioned:
      If it is determined that the execution was not performed in a virtualized environment, the boot process is continued.
      If, on the contrary, it is determined that the execution was performed in a virtualized environment, then the boot process is modified, if not aborted. Several subsequent scenarios can be contemplated: ranging from
        One or more software modules are declared unfit for storage on physical storage, and should only be stored on a RAM disk;
        One or more software modules are disabled;
        The device 10 is shut down, i.e., no data, key, software modules, etc. is handed out to the computer 101.
      Intermediate scenarios can be contemplated as well, which may lead to loading a restrained set of software modules (not all components are allowed), or a modified version of the OS, where patches/programs are loaded to clean the computer 101.

As evoked earlier too, a second type of test, that can be performed consists of testing the initialization firmware (e.g., BIOS) 122 of the computer. Essentially, what is carried out in that case comprises the following steps:

Step S51.1.2: "firmware data" are mapped to a code. Firmware data are data that comprise program code of the initialization firmware 122 of computer 101 and/or data accessible by said initialization firmware 122. The resulting code is a "mapping" code, i.e., to be distinguished from the program code of the firmware; and Step S51.2: it is concluded as to the trustworthiness of the mapping code, i.e., trustworthiness of this code can be attested.

This second type of test shall also impact the subsequent steps S6 (and possibly S10 too), i.e., candidate sets of software modules SMn are preferably determined also according to whether the above code can be attested or not.

Restarting a computer from an external boot media and start a "clean" OS ("clean" from a security perspective) from the external media, or an otherwise trusted OS, is one way of solving the problem that any software executed on a PC may be under attack by a number of viruses and malicious software malware that may be present on the PC's operating system. However, this approach notably raises the following question: Can one trust the BIOS, and more generally any initialization firmware 122 involved at the PC's startup? Indeed, initialization firmware could be prompted to execute while starting the computer, which could be infected. To solve this issue, the above ("bios") test allows for attesting trustworthiness of such firmware, by obtaining data that comprise program code of the initialization firmware and/or data accessible by the initialization firmware while starting to boot and subsequently checking such "firmware data".

How and in what extent the computer shall continue booting from the external boot medium may depend on whether the firmware data are attested, just like with the virtualization test. One key element of both tests is that they require a PC-external trust anchor that is, by definition, much less accessible by a malware or an attacker than a usual PC, PDA, etc.

There are several possible variants as to what critical information, i.e., what firmware data to use. Using the program code (i.e., data capturing the program code of the firmware or only part thereof) itself is already satisfactory inasmuch as it prevents an attacker to change the firmware's program code. Independently from the firmware's program code, using data accessible by the initialization firmware, such as configuration data for the initialization firmware, is also advantageous as the sole configuration data could be tampered with. Ideally, both the firmware's program code of the initialization firmware and data accessible by the initialization firmware are used.

Concerning the firmware data: one can for instance use a hash value that is computed over a ROM or a CMOS ROM dedicated to or accessible by the firmware 122 (hence comprising both the firmware's program code and configuration data) while starting, as well as any other key identification strings. Such data characterize the firmware as such (the firmware's program code) as well as the state of the firmware and therefore provides a sound basis as to whether said initialization firmware is compromised.

Also, mapping such data to a single code enables a quick checking and thus a quick attestation. One may for instance use a hash value computed over the BIOS's ROM, the BIOS's CMOS ROM, and/or other key BIOS identification strings. More generally, any algorithm/subroutine that is capable of mapping a firmware dataset to a code, preferably of a fixed length, such as a single integer, may be used for facilitating the subsequent check. While using a hash function appears more appropriate in many respects, a simple checksum could be relied upon. Now, depending on the security level desired, one may nonetheless prefer using fingerprints i.e., high-performance hash functions to uniquely identify substantial datasets, cryptographic hash functions or, still, randomization functions.

Beyond the two types of tests ("invm", "bios") discussed just above or earlier ("64 bit", "hasvm", main memory capacity, etc.), any test performed at step S5$ii$ (capability checks, trustworthiness checks, etc) may impact the selections of software modules (S6, S10) and where to store them (S9, S11).

The above embodiments have been succinctly described in reference to the accompanying drawings and may accommodate a number of variants. Several combinations of the above features may be contemplated. Examples are given in the next section.

2. Preferred Scenario

S1: The computer 101 and the trusted device are provided. the bootloader 15, 16 and the software modules are initially stored S1 on the trusted device 10;

S2: The user trusted device 10 is connected S2 to the computer 101.

S3: Upon connection S2 of the user trusted device to the computer, the bootloader is detected and one component/part 16 thereof is transferred into the main memory 110 of the computer 101 for subsequent execution;

S4: The bootloader component 16 executes at least partly in the main memory 110, while another component 15 (or module, etc.) may interactively execute at the trusted device 10;

S5: Upon executing, the bootloader may first perform various checks on the machine 101. Then, some requirements are accessed, which concerns:

i. the initial set IS of software modules SM1, . . . SMn, e.g. that an employer or employee wish to execute on the machine 101; and ii. hardware specifications of the computer. The bootloader shall there perform a number of tests T, which typically are logically linked to the software modules of set IS but not necessarily. The bootloader may for instance check whether execution at the machine is performed in a virtualized environment and attest trustworthiness of the machine. Other examples of tests have been discussed earlier.

1. The outcome of these tests shall impact the candidate set(s) of software modules to be determined next, step S6, and more generally the steps S9 and S10.

2. Various booting operations may be completed at this stage, depending on the outcomes of the tests.

3. In variants, the tests (or part thereof) are global and not especially linked to the software modules of the initial set IS. In that case, these tests may even be performed prior to accessing user requirements (step S5$i$).

4. In all cases, whether and in what extent the subsequent steps S6, S9, S10, . . . are carried out depends on the outcomes of the tests.

S6: Next, candidate sets CS1, CS2 of software modules are determined within the initial set IS. Note that memory for the RAM disk is preferably allocated prior to step S6, because the selection of the software modules is preferably made dependent on the allocated memory, which itself depends on the hardware capabilities of the machine. In variants, a predetermined memory size can be relied upon, but in that case the memory utilization of the RAM disk may be suboptimal. In detail:
  a. The software modules in these candidate sets must be compatible with the hardware specifications accessed previously; and
  b. Their size, contents, execution logics, etc., are such that they can be stored as a RAM disk 121. As exemplified in FIG. 4, modules SM4, SM7 failed the tests and are discarded)
  c. The determination of the candidate set(s) may involve a step of prioritizing those software modules that are the most security sensitive, according to a given security criterion. Note that the step of prioritization may be performed prior to steps S6a and S6b, as illustrated in FIG. 4 (and at variance with the embodiment of FIG. 3.A), taking into account outcomes of the tests performed at step S5ii. Indeed, although Steps S6a-c may generally be performed in any order, it may be more efficient to perform them in this order: S6c→S6a→S6b.
    i. A simple selection scheme consists of identifying alternative sets of software modules that altogether fit into the size of the RAM disk 121 (and which otherwise passed the tests of S5ii);
    ii. If prioritization is involved, alternative sets of most sensitive software modules shall be determined, which altogether fit into the RAM disk 121 and passed the tests.
S7: Depending on the policy relied on, and possible dependencies between the software modules (and corresponding drivers, if any), several potential candidate sets CS1, CS2, could be determined. In that case, the method includes additional steps S7 for identifying a final set FS of software modules that is finally chosen CS2 out of the several candidate sets.
  This is preferably carried out according to inputs received (step S7b) from the user trusted device, e.g., thanks to the part 15 of the bootloader that executes at the user trusted device interactively with the part 16 of the bootloader that executes in the main memory, after having submitted (step S7a) the candidate sets to the user for validation.
  In the example of FIG. 4, the two possible candidate sets are denoted by CS1 (SM8 . . . SM6) and CS2 (SM8 . . . SM3).
  In this example, further interaction S7 with a user is needed to choose among SM3 or SM6, because due to the prior prioritization step and the size of modules SM8 . . . SM2 (that are each more sensitive than SM3 and SM6), only one additional module (SM3 or SM6) can be stored on the RAM disk.
S8: The software modules of the set CS2 finally retained (=FS) are transferred to the computer 101. Said modules may initially be stored on the user trusted device 10 or at a remote server 30. One possibility is to have them stored on the device 10. The finally retained modules can thus be quickly transferred from the trusted device to the main memory for subsequent storage and execution as a RAM disk, without requiring additional network connection. This is typically the bootloader (executing on either side, i.e., computer or user device) that instructs to transfer the software modules.
S9: The software modules are then stored on a RAM disk, which step preferably decomposes as follows:
  a. First, memory for the RAM disk could be allocated (or even corrected at this stage, based on the final selection of software modules), in variants to the preferred option evoked at step S6 earlier.
  b. Metadata of a file system for the RAM disk are computed, according to the software modules of the final set FS: the metadata specify which files are to be stored in which memory section of the RAM disk;
  c. The metadata are then written to individual memory sections, for example data blocks, on the RAM disk; and
  d. The files of software modules retained are copied in the file system, one after the other, into the memory sections and according to the metadata.
  e. It is finally instructed to execute them directly on the RAM disk.
S10: After or concurrently with step S7, one may further determine an additional set AS of software modules SM6, . . . SMk, i.e., comprising modules that shall not be in the final set retained for execution as a RAM disk; and
S11: Store the modules SM6, . . . SMk of this additional set AS, preferably encrypted (step S11a), on the physical storage medium 120 of the computer, for subsequent execution (step S11b). As per the prioritization process, these additional modules present less risk than the modules retained in CS2 (or no risk at all). They can therefore be stored on the physical storage medium 120, with moderate risk. Of course, in variants, stricter policies may be implemented which prevent storing any module on the physical storage medium 120.
S12: At the end of a session, the user (or the device 10, or still the module 16 still executing on the main memory) may instruct to stop execution of software modules stored as the RAM disk (step S12a) or on the physical storage 120 (step S12b). Then, the process may terminate by:
S13: Disconnecting the device 10; and
S14: Removing software from the physical storage 120.
S15: Finally, the RAM is cleared. As illustrated, this step is preferably carried out after the physical storage system has been cleared. This is to eliminate any remaining data from the computer 101, e.g., persistent (physically stored) data that is typically cached in RAM for higher operational performance. This way, the system ascertains that no traces of the session are left behind for possible attackers.

3. Technical Implementation Details of Some Specific Embodiments

Examples of (sequences of) instructions that could advantageously be used for implementing embodiments of the invention follow. The person skilled in the art shall appreciate that other instructions with the same/similar functionality exist that can be used to achieve essentially the same.

To start with, an example of an API follows that allows for reading BIOS information ("firmware configuration data"):
outb(cmos_data_address, 0x70);
data_at_address=inb(0x71);
where cmos_data_address is iterated over the range 0 . . . max_cmos_data_address. Other similar instructions for reading the firmware's program code itself and/or the firmware configuration are provided by the Intel 82802AB/82802AC Firmware Hub (FWH).

In the EFI BIOS, the EFI configuration can be accessed by reading the EFI variables through the GetVariable function call. Obtaining information on the BIOS itself works similar to traditional BIOSes, especially if e.g., the Intel Firmware Hub is used.

Next, an example of instructions is given that allows for interacting with the user trusted device from the PC:

Read a block from user trusted device (mass storage device)
mov ah, 42 h
mov dl, the_drive_to_read_from
mov ds:si, disk_address_packet_describing_what_to_read
int 13 h
Write a block to user trusted device (mass storage device)
mov ah, 43 h
mov dl, the_drive_to_write_to
mov ds:si, disk_address_packet_describing_what_to_write
int 13 h In the EFI BIOS, the so-called EFI_DISK_IO_PROTOCOL or EFI_BLOCK_IO_PROTOCOL could be used, which both provide Read and Write functions.

Suitable disk I/O commands are easily accessible for the one skilled in the art.

Finally, an example of a sequence of instructions that can be used by the modules to initialize a PXE BIOS include but are not limited to:
Load UNDI ROM
PXENV_START_UNDI
PXENV_UNDI_STARTUP
PXENV_UNDI_INITIALIZE
PXENV_UNDI_OPEN An additional instruction (e.g., PXENV_UNDI_TRANSMIT) could be appended to send packets to the server 30, via the network card 124. By way of such instructions, the modules interact, upon execution at the host, with the PXE BIOS 122 to initialize the network card 124, whereby a communication can be initiated over the network.

Similar instructions are provided by EFI and UEFI BIOSes in the EFI_SIMPLE_NETWORK API (Initialize, Start, Stop, Receive, Transmit). BIOSes may also provide higher level protocol implementations of the TCP/IP stack and other networking protocols which may be used as well.

Hardware specification can be obtained using the cpuid id CPU instruction which returns in the CPU registers the features supported. Different CPU information is available for different ids passed to that function. Additionally, some hardware specification (for instance whether virtualization support had been disabled by the BIOS) can be obtained using model specific registers which can be obtained through the rdmsr reg CPU instruction.

Finally, executing software modules may for instance be accomplished using the system( ), or the exec( ) family of POSIX functions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation to the teachings of the present invention without departing from its scope. Therefore, it is intended that the present invention not be limited to the particular embodiments disclosed, but that the present invention will include all embodiments falling within the scope of the appended claims. In addition, many variants not explicitly touched above can be contemplated. For example, the secure device could be powered with solar cells or any other suitable batteries, etc. As touched earlier, the computerized methods described herein have been described according to their main functions, which have been assigned to respective modules 15-17, for the sake of clarity. However, embodiments of the present invention could be equivalently described with the same functions recast over only one module, or more modules.

REFERENCE LIST

10 User trusted device 124 Network card
11 Secure device's CPU 125 Display controller
12 Connection interface of user trusted 130 Display device
141 Secure memory of trusted device
13 Encryption/decryption key 142 Non-secure memory of trusted
14 Persistent memory of trusted device device
15, 16 Bootloader 145 I/O devices (or peripherals)
15 Bootloader (part executing at the 150 Keyboard user trusted device) 151 first portion of local part of
16 Bootloader (part transferred to bootloader main memory of computer) 152 second portion of local part of
17 Verification module bootloader
30 Server 155 Mouse
100 General computerized system 165 Network
101 Host computer AS set (additional set) of software
105 Computer processor modules
110 Main memory of computer CS1, CS2, CSp sets (candidate sets) of
111 Operating system (OS) software modules
115 Memory controller Fij jth file of software module SMi
120 physical storage medium (e.g. disk) FS Final set of software modules
121 RAM disk IS Initial set of software modules
121fs File system for the RAM disk MDl Metadata
122 Firmware/initialization software SMi Software modules (e.g., BIOS) of the host computer T Software modules Tests

The invention claimed is:

1. A method for executing software modules on a computer, the method comprising:
  determining that a user trusted device is connected to the computer, the computer having a main memory, through a bootable communication port of the computer, the user trusted device having a secure memory and a non-secure memory, wherein the secure memory stores a first part of a bootloader and the non-secure memory stores a second part of the bootloader;
  transferring, in response to the determining the user trusted device is connected to the computer, a second part of the bootloader to the main memory;
  interactively executing the first part of the bootloader and the second part of the bootloader by:
    executing, by a first processor of the user trusted device, the first part of the bootloader, and
    executing, by a second processor of the computer, the second part of the bootloader in the memory of the computer, wherein the second part of the bootloader executing on the computer communicates with the first part of the bootloader executing on the user trusted device though the bootable communication port;

upon interactively executing the first part of the bootloader and the second part of the bootloader:

accessing, by the second part of the bootloader executing on the computer:

requirements as to an initial set of software modules executable on the computer, wherein the software modules are stored in the secure memory of the user trusted device, and hardware specifications of the computer;

determining, by the second part of the bootloader executing on the computer, within said initial set, one or more candidate sets of software modules that are compatible with said hardware specifications and can be stored as a RAM disk;

transferring, by the first part of the bootloader executing on the user trusted device, the software modules of a final set from the user trusted device to the main memory of the computer, the final set being one of the one or more candidate sets; and storing the software modules of the final set on a RAM disk and instructing to execute the software modules stored on the RAM disk, wherein each of the initial set and the final set of software modules comprises application components and operating system image components, and further comprises hardware component drivers.

2. The method of claim 1, wherein transferring the software modules comprises:

retrieving the software modules from the secure memory;

decrypting the secure modules; and transmitting the secure modules over the bootable communication port to the second part of the bootloader executing on the computer.

3. The method of claim 1, wherein the method further comprises, prior to storing and instructing to execute software modules as a RAM disk, a step of:

identifying one final set of software modules out of several candidate sets of software modules, according to inputs received from the user trusted device, based on the interactively executing the first part of the bootloader and the second part of the bootloader.

4. The method of claim 1, wherein determining one or more candidate sets of software modules that can be stored as a RAM disk comprises prioritizing software modules that are the most security sensitive according to a given security criterion.

5. The method of claim 1, wherein the method further comprises:

determining an additional set of software modules that are not in the final set of software modules to be executed on the RAM disk; and storing software modules of this additional set, encrypted, on a physical storage medium of the computer, for subsequent execution.

6. The method of claim 1, wherein accessing hardware specifications of the computer comprises performing tests in respect of one or more of:

a capacity of the main memory of the computer;

a processor architecture of the computer;

a capacity of a storage medium of the computer; and whether virtualization is supported, and wherein at least some of said tests are logically linked to software modules of the initial set; and determining one or more candidate sets of software modules that can be stored as a RAM disk comprises prioritizing software modules according to outcomes of the tests performed.

7. The method of claim 1, further comprising:

allocating memory for the RAM disk prior to determining said one or more candidate sets of software modules that can be stored as a RAM disk;

and wherein the step of storing the software modules comprises:

computing metadata of a file system for the RAM disk according to the software modules of the final set, said metadata specifying which files constituting these software modules are to be stored and where they are to be stored on the file system;

writing the metadata to individual memory sections, for example memory blocks, on the RAM disk; and copying files of software modules of the final set in the file system, one after the other, into the memory sections and according to the metadata.

8. The method of claim 1, wherein determining within said initial set, the one or more candidate sets of the software modules that are compatible with said hardware specifications and can be stored as a ram disk comprises:

determining, within the initial set, a first subset of the software modules that are compatible with the hardware specifications; and determining, within the first subset, one or more second subsets of the software modules that can be stored as the RAM disk, so that only technically relevant software modules are considered as a possible candidate for being executed as the RAM disk.

9. A user trusted device, comprising:

a connection interface enabling connection with a computer, the computer having a main memory, wherein the user trusted device is connected to the computer through a bootable communication port of the computer; and a persistent memory, wherein the persistent memory comprises a secure memory and a non-secure memory storing:

a bootloader, wherein the secure memory stores a first part of the bootloader and the non-secure memory stores a second part of the bootloader, and wherein, upon determining the user trusted device is connected to the computer, the second part of the bootloader is transferred to the main memory, the first part of the bootloader and the second part of the bootloader being interactively executable by:

executing, by a first processor of the user trusted device, the first part of the bootloader, and executing, by a second processor of the computer, the second part of the bootloader in the memory of the computer, wherein the second part of the bootloader executing on the computer communicates with the first part of the bootloader executing on the user trusted device through the bootable communication port;

and configured such that interactively executing the first part of the bootloader and the second part of the bootloader causes:

accessing, by the second part of the bootloader executing on the computer:

requirements as to an initial set of software modules executable on the computer, wherein the software modules are stored in the secure memory of the user trusted device, and hardware specifications of the computer;

determining, by the second part of the bootloader executing on the computer, within said initial set, one or more candidate sets of software modules that are compatible with said hardware specifications and can be stored as a RAM disk;

transferring, by the first part of the bootloader executing on the user trusted device, the software modules of a final set from the user trusted device to the main memory of the computer, the final set being one of the one or more candidate sets; and storing the software modules of the final set on a RAM disk and instructing to execute the software modules stored on the RAM disk, wherein the software modules comprise application components, operating system image components, and hardware component drivers.

10. The user trusted device of claim 9, wherein the persistent memory further stores:

software modules, which comprise application components, operating system image components, and hardware component drivers; and software module tests for determining whether said software modules are compatible with said hardware specifications and can be stored as a RAM disk, wherein determining one or more candidate sets of software modules that can be stored as a RAM disk comprises:

determining, within the initial set, a first subset of the software modules that are compatible with said hardware specifications, and determining, within the first subset, one or more second subsets of the software modules that can be stored as the RAM disk, so that only technically relevant software modules are considered as a possible candidate for being executed as the RAM disk, wherein, the software module tests are logically linked to said software modules.

11. The user trusted device of claim 9, wherein the second part of the bootloader resides encrypted on the non-secure memory, a corresponding encryption key or decryption key being stored on the secure memory.

12. The user trusted device of claim 9, wherein the bootloader is further configured to cause, as part of software module tests for determining whether said software modules are compatible with said hardware specifications and can be stored as a RAM disk, to:

instruct a processor of the computer to execute virtualization sensitive code and to issue completion data upon completion of execution;

determine, based on such completion data whether the execution was performed in a virtualized environment; and determine said one or more candidate sets of software modules also according to whether the execution of the virtualization sensitive code was performed in a virtualized environment.

13. The user trusted device of claim 9, wherein the bootloader is further configured to cause, as part of software module tests for determining whether said software modules are compatible with said hardware specifications and can be stored as a RAM disk, to:

map firmware data to a code, the firmware data comprising program code of an initialization firmware and/or data accessible by the initialization firmware of the computer;

attest trustworthiness of the code; and determine said one or more candidate sets of software modules also according to whether the code is attested.

14. A system comprising:

a user trusted device comprising:

a computer, the computer having a main memory, to which the user trusted device is connectable, a connection interface enabling connection with the computer, wherein the user trusted device is connected to the computer through a bootable communication port of the computer; and a persistent memory, wherein the persistent memory comprises a secure memory and a non-secure memory, storing:

a bootloader, wherein the secure memory stores a first part of the bootloader and the non-secure memory stores a second part of the bootloader, and wherein, upon determining the user trusted device is connected to the computer, the second part of the bootloader is transferred to the main memory, the first part of the bootloader and the second part of the bootloader being interactively executable by:

executing, by a first processor of the user trusted device, the first part of the bootloader, and executing, by a second processor of the computer, the second part of the bootloader in the memory of the computer, wherein the second part of the bootloader executing on the computer communicates with the first part of the bootloader executing on the user trusted device through the bootable communication port;

and configured such that interactively executing the first part of the bootloader and the second part of the bootloader causes:

accessing, by the second part of the bootloader executing on the computer:

requirements as to an initial set of software modules executable on the computer, wherein the software modules are stored in the secure memory of the user trusted device, and hardware specifications of the computer;

determining, by the second part of the bootloader executing on the computer, within said initial set, one or more candidate sets of software modules that are compatible with said hardware specifications and can be stored as a RAM disk;

transferring, by the first part of the bootloader executing on the user trusted device, the software modules of a final set from the user trusted device to the main memory of the computer, the final set being one of the one or more candidate sets; and storing the software modules of the final set on a RAM disk and instructing to execute the software modules stored on the RAM disk, and said software modules comprising application components, operating system image components, and hardware component drivers.

* * * * *